(12) United States Patent
Ota et al.

(10) Patent No.: US 7,476,469 B2
(45) Date of Patent: Jan. 13, 2009

(54) LITHIUM SECONDARY BATTERY

(75) Inventors: Taeko Ota, Osaka (JP); Hiroyuki Fujimoto, Kobe (JP); Ryuji Ohshita, Tokushima (JP); Maruo Kamino, Kobe (JP)

(73) Assignee: Santo Electric Co., Ltd., Osaka (JP)

( * ) Notice: Subject to any disclaimer, the term of this patent is extended or adjusted under 35 U.S.C. 154(b) by 810 days.

(21) Appl. No.: 10/451,846

(22) PCT Filed: Jan. 17, 2002

(86) PCT No.: PCT/JP02/00265

§ 371 (c)(1),
(2), (4) Date: Jun. 26, 2003

(87) PCT Pub. No.: WO02/058182

PCT Pub. Date: Jul. 25, 2002

(65) Prior Publication Data
US 2005/0100790 A1 May 12, 2005

(30) Foreign Application Priority Data
Jan. 18, 2001 (JP) ............................ 2001-010448

(51) Int. Cl.
H01M 4/40 (2006.01)
H01M 4/66 (2006.01)
(52) U.S. Cl. .................. 429/330; 429/231.95; 429/245
(58) Field of Classification Search ........................ None
See application file for complete search history.

(56) References Cited

U.S. PATENT DOCUMENTS

| | | | | |
|---|---|---|---|---|
| 5,455,453 A | * | 10/1995 | Harada et al. | 257/675 |
| 5,494,762 A | * | 2/1996 | Isoyama et al. | 429/221 |
| 6,174,629 B1 | * | 1/2001 | Gan et al. | 429/326 |
| 6,332,900 B1 | * | 12/2001 | Muffoletto et al. | 29/623.5 |
| 6,368,746 B1 | * | 4/2002 | Takada et al. | 429/305 |
| 6,800,400 B2 | * | 10/2004 | Ota et al. | 429/343 |
| 6,835,496 B1 | * | 12/2004 | Kaminaka et al. | 429/218.1 |

(Continued)

FOREIGN PATENT DOCUMENTS

JP 06-314565 A 11/1994

(Continued)

OTHER PUBLICATIONS

H.V. Venkatasetty, Novel Lithium-Polymer Electrolytes for Lithium Battery, 1996, IEEE, pp. 311-316.*

Primary Examiner—Susy Tsang-Foster
Assistant Examiner—Alix Echelmeyer
(74) Attorney, Agent, or Firm—Kubovcik & Kubovcik

(57) ABSTRACT

A rechargeable lithium battery including a positive electrode, a negative electrode and a nonaqueous electrolyte, said positive or negative electrode being an electrode which has, on a current collector, a thin film of active material that stores and releases lithium, the thin film of active material being divided into columns by gaps formed therein in a manner to extend in its thickness direction, and the columnar portions being at their bottoms adhered to the current collector, the rechargeable lithium battery being characterized in that the nonaqueous electrolyte includes a mixed solvent consisting of two or more different solvents and containing at least ethylene carbonate and/or vinylene carbonate as its constituent.

18 Claims, 2 Drawing Sheets

U.S. PATENT DOCUMENTS

| | | | |
|---|---|---|---|
| 6,887,623 B2 * | 5/2005 | Fujimoto et al. | 429/232 |
| 7,192,673 B1 * | 3/2007 | Ikeda et al. | 429/209 |
| 7,195,842 B1 * | 3/2007 | Fujimoto et al. | 429/209 |
| 7,309,548 B2 * | 12/2007 | Ota et al. | 429/307 |
| 2004/0048161 A1 * | 3/2004 | Sunagawa et al. | 429/231.5 |

FOREIGN PATENT DOCUMENTS

| | | | |
|---|---|---|---|
| JP | 08-335465 A | | 12/1996 |
| JP | 10-294112 A | | 11/1998 |
| JP | 2000-294251 A | | 10/2000 |
| JP | 2000-311706 A | | 11/2000 |
| JP | 2001-266951 A | | 9/2001 |
| JP | 2001-291514 A | | 10/2001 |
| JP | 2002-075350 A | | 3/2002 |
| WO | WO01/31720 | * | 3/2001 |

* cited by examiner

LITHIUM SECONDARY BATTERY

TECHNICAL FIELD

The present invention relates to a rechargeable lithium battery and particularly to the improvement of a nonaqueous electrolyte in a rechargeable lithium battery which utilizes an electrode having, on a current collector, a thin film of active material that stores and releases lithium.

BACKGROUND ART

Rechargeable lithium batteries, recently under extensive development, exhibit battery performance characteristics, such as charge-discharge voltage, charge-discharge cycle life characteristics and storage characteristics, which depend largely upon the types of the electrodes used.

In accordance with the previous finding of the present applicant, an electrode having, on a current collector, a thin film of active material that stores and releases lithium, such as an amorphous or microcrystalline silicon thin film, exhibits a high charge-discharge capacity and shows superior charge-discharge cycle characteristics. This electrode has such a structure that the thin film of active material is divided into columns by gaps formed therein in a manner to extend in its thickness direction and the columnar portions are at their bottoms adhered to the current collector. This structure enables the electrode to exhibit superior charge-discharge cycle performance characteristics, because the spaces provided to surround those columnar portions serve to relax a stress engendered as the thin film expands and shrinks during charge-discharge cycles and thus lessen a stress that acts to separate the thin film of active material from the current collector.

However, the relationship between nonaqueous electrolyte and charge-discharge cycle characteristics has not been fully investigated for rechargeable lithium batteries using such an electrode.

DISCLOSURE OF THE INVENTION

It is an object of the present invention to provide a rechargeable lithium battery which utilizes an electrode having, on a current collector, a thin film of active material that stores and releases lithium and which exhibits further improved charge-discharge characteristics.

The rechargeable lithium battery of the present invention includes a positive electrode, a negative electrode and a nonaqueous electrolyte. The positive or negative electrode comprises an electrode which has, on a current collector, a thin film of active material that stores and releases lithium and which has such a structure that the thin film of active material is divided into columns by gaps formed therein in a manner to extend in its thickness direction and the columnar portions are at their bottoms adhered to the current collector. Characteristically, the nonaqueous electrolyte includes a mixed solvent consisting of two or more different solvents and containing at least ethylene carbonate as its constituent.

In the present invention, the mixed solvent preferably contains cyclic carbonate and chain carbonate. Preferably, ethylene carbonate is contained as cyclic carbonate. Inclusion of ethylene carbonate as cyclic carbonate, as well as chain carbonate, further improves charge-discharge cycle performance characteristics.

Preferably, vinylene carbonate is further contained as cyclic carbonate. Inclusion of vinylene carbonate further improves charge-discharge cycle performance characteristics.

Preferably, diethyl carbonate is contained as chain carbonate. Inclusion of diethyl carbonate further improves charge-discharge cycle performance characteristics.

In view of conductivity and viscosity, the mixed solvent contains cyclic carbonate and chain carbonate preferably at a ratio by volume (cyclic carbonate:chain carbonate) of 1:9-8:2, more preferably 2:8-6:4.

In the present invention, an ethylene carbonate content is preferably in the approximate range of 10-80 volume %, based on the total volume of the mixed solvent. Vinylene carbonate is preferably incorporated in the approximate amount of 0.1-80 volume %, based on the total volume of the mixed solvent. More preferably, vinylene carbonate is incorporated in the amount of at least 0.5 parts by weight (0.4 parts by volume), based on 100 parts by weight (100 parts by volume) of the mixed solvent excluding vinylene carbonate.

A rechargeable lithium battery in accordance with the other aspect of the present invention includes a positive electrode, a negative electrode and a nonaqueous electrolyte. The positive or negative electrode comprises an electrode which has, on a current collector, a thin film of active material that stores and releases lithium and which has such a structure that the thin film of active material is divided into columns by gaps formed therein in a manner to extend in its thickness direction and the columnar portions are at their bottoms adhered to the current collector. Characteristically, the nonaqueous electrolyte includes a mixed solvent consisting of two or more different solvents and containing at least vinylene carbonate as its constituent.

A vinylene carbonate content is preferably in the range of 0.1-80 volume %, based on the total volume of the mixed solvent. More preferably, vinylene carbonate is incorporated in the amount of at least 0.5 parts by weight (0.4 parts by volume), based on 100 parts by weight (100 parts by volume) of the mixed solvent excluding vinylene carbonate.

Also in this aspect, the mixed solvent preferably contains cyclic carbonate and chain carbonate, as previously mentioned. Preferably, the mixed solvent contains the same ratio by volume of cyclic carbonate and chain carbonate as specified earlier.

"The present invention", as used hereinafter, is meant to encompass the above-described other aspect as well.

In the present invention, other solvents than ethylene carbonate and vinylene carbonate can also be used. The types of such solvents are not particularly specified, so long as they are applicable to rechargeable lithium batteries. Examples of useful solvents include cyclic carbonates such as propylene carbonate and butylene carbonate, and chain carbonates such as dimethyl carbonate, diethyl carbonate and methyl ethyl carbonate. Preferably, a mixed solvent containing cyclic carbonate and chain carbonate is used. Cyclic carbonate in combination with an ether solvent such as 1,2-dimethoxyethane or 1,2-diethoxyethane or with a chain ester such as γ-butyrolactone, sulfolane or methyl acetate may also be a useful mixed solvent.

The nonaqueous electrolyte solute is not particularly specified in type, so long as it is useful for rechargeable lithium batteries. Examples of nonaqueous electrolyte solutes include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$ and $Li_2B_{12}Cl_{12}$. Particularly preferred for use is a mixed solute of $LiXF_y$ (wherein X is P, As, Sb, B, Bi, Al, Ga or In; and y is 6 if X is P, As or Sb or 4 if X is B, Bi, Al, Ga or In) either with lithium perfluoroalkylsulfonimide $LiN(C_mF_{2m+1}SO_2)(C_nF_{2n+1}SO_2)$ (wherein m and n are independent integers of 1-4) or with lithium perfluoroalkylsulfonmethide $LiC(C_pF_{2p+1}SO_2)$ ($C_qF_{2q+1}SO_2$) ($C_rF_{2r+1}SO_2$) (wherein p, q and r are independent integers of 1-4). Particularly preferred among them is a mixed solute of $LiPF_6$ and $LiN(C_2F_5SO_2)_2$.

Other useful nonaqueous electrolytes include gelled polymer electrolytes comprised of an electrolyte solution impregnated into polymer electrolytes such as polyethylene oxide, polyacrylonitrile and polyvinylidene fluoride; and inorganic solid electrolytes such as LiI and $Li_3N$, for example.

The electrolyte for the rechargeable lithium battery of the present invention can be used without limitation, so long as an Li compound serving as its solute that imparts an ionic conductivity, together with its solvent that dissolves and retains the Li compound, remain undecomposed at voltages during charge, discharge and storage of the battery.

In the present invention, the aforementioned thin film of active material is divided into columns by the gaps formed therein and extending in its thickness direction, so that spaces are provided in a manner to surround the columnar portions. These spaces serve to lessen a stress engendered due to expansion and shrinkage of the thin film on charge and discharge and thereby suppress production of a stress that acts to separate the thin film of active material from the current collector. Accordingly, the columnar portions can be kept closely adherent at their bottoms to the current collectors.

In accordance with the present invention, ethylene carbonate and/or vinylene carbonate present in the nonaqueous electrolyte is likely to form a film which selectively covers the columnar portions of the active material thin film and keeps the columnar structure stable and thereby further improve charge-discharge cycle characteristics.

In the present invention, a thickness portion of the thin film that occupies at least a half of its thickness is preferably divided into columns by the gaps.

Also, in the case where irregularities are formed on a surface of the thin film in which gaps are formed to originate from valleys of the irregularities, such gaps may be provided so as for each columnar portion to encompass at least one projection on the thin film surface. Alternatively, these gaps may be provided so as for each columnar portion to encompass plural projections.

In the present invention, the gaps may be formed in the thin film on the first or subsequent charge-discharge cycle. Illustrating such a case, the thin film may be provided having irregularities on its surface before charge and discharge. On the first or subsequent charge-discharge cycle, gaps are formed in a manner to originate from valleys of the irregularities on the thin film surface to thereby divide the thin film into columns.

The irregularities on the thin film surface may be formed in a manner to generally conform in shape to those on a surface of the underlying current collector. That is, the thin film can have such irregularities by using the current collector having irregularities on its surface and depositing the thin film thereon.

A surface roughness Ra of the current collector is preferably 0.01 µm or larger, more preferably in the range of 0.01-1 µm, further preferably in the range of 0.05-0.5 µm. The surface roughness Ra is defined in Japanese Industrial Standards (JIS B 0601-1994) and can be measured as by a surface roughness meter.

In the present invention, the surface roughness Ra of the current collector preferably satisfies the relationship Ra≦t, where t is a thickness of the thin film of active material. Also, the surface roughness Ra of the current collector and an average distance S between neighboring local peaks preferably satisfy the relationship 100Ra≧S. The average distance S between local peaks is defined in Japanese Industrial Standards (JIS B 0601-1994) and can be measured as by a surface roughness meter.

The shape of projections of the irregularities on the current collector surface is not particularly specified, but may preferably be conical, for example.

Preferably, the projections have a round top which shape is suited to avoid local concentration of current during a charge-discharge reaction.

In the present invention, the gaps are formed in the thin film composed of active material in a manner to extend in its thickness direction. Such gaps may be formed on the first or subsequent charge-discharge cycle, or pre-formed before charge and discharge. Illustrating one method of forming such gaps in the thin film before being subjected to a charge-discharge process, the thin film in the electrode before being assembled into a battery is allowed to store and release lithium so that the thin film is made to expand and shrink in volume. In an exemplary case where lithium-free active material is used for a positive electrode, assembling may be carried out while lithium is stored in the thin film. Alternatively, the thin film may be deposited through a resist film patterned by photolithography so that it is rendered into the form of columns divided by gaps.

In the present invention, the thin film of active material can be formed from one or more materials capable of producing compounds or solid solutions with lithium, e.g., at least one selected from elements from Groups IIB, IIIB, IVB and VB of the periodic table and oxides and sulfides of transition metal elements from Periods 4, 5 and 6 of the periodic table.

In the present invention, examples of elements from Groups IIB, IIIB, IVB and VB of the periodic table that can produce compounds or solid solutions with lithium include carbon, aluminum, silicon, phosphorus, zinc, gallium, germanium, arsenic, cadmium, indium, tin, antimony, mercury, thallium, lead and bismuth. Specific examples of transition metal elements from Periods 4, 5 and 6 of the periodic table include scandium, titanium, vanadium, chrome, manganese, iron, cobalt, nickel, copper, zinc, yttrium, zirconium, niobium, molybdenum, technetium, ruthenium, rhodium, palladium, silver, cadmium, lanthanum series elements, hafnium, tantalum, tungsten, rhenium, osmium, iridium, platinum, gold and mercury.

Preferred among the above-listed elements is at least one selected from carbon, silicon, germanium, tin, lead, aluminum, indium, zinc, cadmium, bismuth and mercury. Silicon and/or germanium is more preferred.

In general, silicon can be roughly classified by its crystalline form into amorphous silicon, microcrystalline silicon, polycrystalline silicon and single crystal silicon. The term "noncrystalline silicon", as used herein, is meant to encompass amorphous silicon and microcrystalline silicon and exclude polycrystalline silicon and single crystal silicon. Silicon is identified as the amorphous silicon when Raman spectroscopy detects substantial absence of a peak around 520 $cm^{-1}$ which corresponds to a crystalline region, and as the microcrystalline silicon when Raman spectroscopy detects the substantial presence of a peak around 520 $cm^{-1}$ corresponding to the crystalline region and a peak around 480 $cm^{-1}$ which corresponds to an amorphous region. The microcrystalline silicon thus consists substantially of a crystalline region and an amorphous region. Silicon is identified as the single crystal silicon or polycrystalline silicon when Raman spectroscopy detects substantial absence of a peak around 480 $cm^{-1}$ corresponding to the amorphous region.

In the present invention, a microcrystalline or amorphous silicon thin film is preferably used as the aforementioned thin film of active material.

In addition to the preceding silicon thin film, a germanium thin film and a silicon-germanium alloy thin film may also be used as the preferred thin film of active material in accordance with the present invention. The germanium thin film in the amorphous or microcrystalline form is preferably used. The silicon-germanium alloy thin film in the microcrystalline or amorphous form is preferably used. The preceding procedure applied to the silicon thin film can be similarly used to determine the microcrystalline or amorphous nature of the germanium and silicon-germanium alloy thin films. Silicon and germanium are found to enter uniformly into a solid solution and provide good results. It is accordingly believed that similar results are obtained with the use of their alloy, i.e., silicon-germanium alloy.

In the present invention, the thin film of active material can be deposited on the current collector by various methods which include, for example, CVD, sputtering, vapor evaporation, spraying and plating. Particularly preferred among those thin film-forming methods are CVD, sputtering and vapor evaporation.

The current collector for use in the present invention is not particularly specified in type, so long as it assures good adhesion to the thin film of active material. More specifically, the current collector may comprise at least one material/metal selected from copper, nickel, stainless steel, molybdenum, tungsten and tantalum, for example.

The current collector preferably has a small thickness and preferably comprises a metal foil. The current collector preferably comprises a material which does not alloy with lithium. The particularly preferred material is copper. The current collector is preferably in the form of a copper foil which is preferably roughened at its surface. A typical example of such a copper foil is an electrolytic copper foil. This electrolytic copper foil can be obtained, for example, by immersing a metallic drum in an electrolyte solution containing copper ions dissolved therein, rotating the drum simultaneously with introduction of current so that copper is deposited on a surface of the drum, and removing the deposited copper from the drum. One or both sides of the electrolytic copper foil may be subjected to a roughening or other surface treatment.

Alternatively, the current collector may comprise a surface-roughened copper foil obtainable by depositing copper on a surface of a rolled copper foil by an electrolytic process.

Also, an interlay may be provided between the current collector and the active thin film. In such an instance, the interlayer preferably contains a component easy to diffuse into the active material thin film, e.g., preferably comprises a copper layer. For example, a copper layer may be superimposed on a surface-roughened nickel foil (e.g., electrolytic nickel foil) to provide the current collector. Alternatively, copper may be deposited on a nickel foil by an electrolytic process to provide a surface-roughened nickel foil for use as the current collector.

In the present invention, the low-density regions may be pre-formed in the thin film of active material in a fashion to extend in its thickness direction so that the gaps will be later formed along such low-density regions. These low-density regions may be formed in a manner to extend upwardly from valleys of irregularities on a surface of the current collector, for example.

In the present invention, a constituent of the current collector preferably diffuses into the thin film of active material. The diffusion of the current collector constituent into the thin film improves adhesion between the current collector and the thin film of active material. In the case where the diffusing current collector constituent is copper or other element that does not alloy with lithium, the active material thin film in the diffusion region is less alloyed with lithium and undergoes less expansion and shrinkage during a charge-discharge reaction. This suppresses production of a stress that acts to separate the thin film of active material from the current collector.

Preferably, the concentration of the current collector constituent diffused into the thin film is high in the vicinity of the current collector and lower at a location closer to the thin film surface. Due to the presence of such a concentration gradient of the current collector constituent, the active material thin film near the current collector is less subjected to expansion and shrinkage during a charge-discharge reaction, whereby it is made easy to suppress production of a stress that acts to separate the thin film of active material in the vicinity of the current collector. Also, the decreasing concentration of the current collector constituent toward the thin film surface enables retention of a high charge-discharge capacity.

It is preferred that the diffused current collector constituent forms a solid solution, instead of an intermetallic compound, with a component of the thin film. The intermetallic compound, as used herein, refers to a compound which has a specific crystal structure formed via combination of metals in specific proportions. Formation of solid solution, instead of intermetallic compound, of the thin film component and the current collector constituent improves adhesion between the thin film and the current corrector, resulting in obtaining the further increased charge-discharge capacity.

In the present invention, the thin film of active material may be doped with an impurity. Examples of such impurities include elements of the periodic Groups IIIB, IVB, VB and VIB, such as phosphorus, aluminum, arsenic, antimony, boron, gallium, indium, oxygen and nitrogen.

The thin film of active material in accordance with the present invention may be made up of a sequence of superimposed layers. These layers may differ from each other in terms of composition, morphology, impurity concentration or the like. Such layers may provide a thin film structure graded in its thickness direction. For example, such layers, if properly arranged, may provide a graded thin film structure wherein the composition, morphology, impurity concentration or the like is varied in its thickness direction.

Preferably, the thin film of active material in the present invention stores lithium via formation of an alloy with lithium.

Lithium may be previously stored in or added to the thin film of active material in the present invention. Lithium may be added during formation of the active material thin film. That is, lithium may be introduced by forming the active material thin film containing lithium. Alternatively, lithium may be added or stored after formation of the active material thin film. One method is to use an electrochemical mechanism whereby lithium is added or stored in the active material thin film.

The thickness of the thin film of active material in the present invention is not particularly specified, but may be 20 μm or below. The thickness is preferably 1 μm or above in order to obtain a high charge-discharge capacity.

In the present invention, an interlayer may be provided between the current collector and the thin film to improve adhesion therebetween, as stated earlier. Preferably, such an interlayer comprises a material which forms an alloy, more preferably a solid solution, with each of the current collector material and the active material.

BEST MODE FOR CARRYING OUT THE INVENTION

Figure 1:
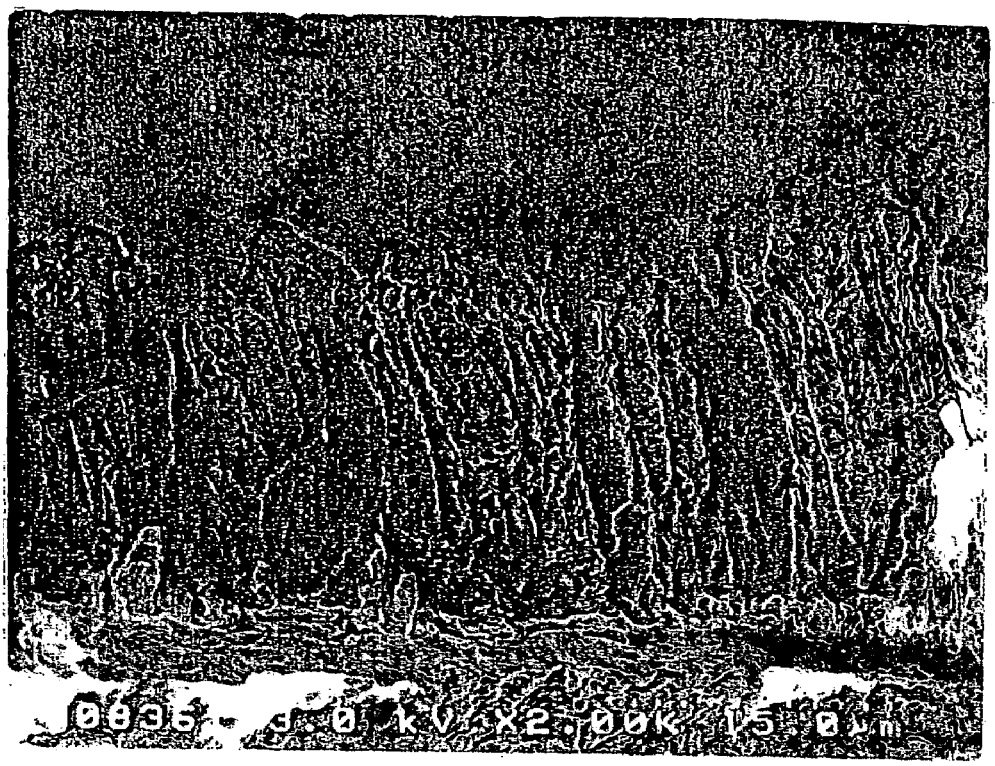
FIG. 1 is a photomicrograph taken using a scanning electron microscope (at a magnification of 2,000×), showing the condition of a negative electrode recovered from a battery in an example of this invention after 100 cycles.

The present invention is below described in more detail by way of Examples. It will be recognized that the following examples merely illustrate the practice of the present invention but are not intended to be limiting thereof. Suitable changes and modifications can be effected without departing from the scope of the present invention.

(Fabrication of Negative Electrode)

An electrolytic copper foil (18 μm thick, surface roughness Ra=0.188 μm) was used as a current collector. A silicon thin film was deposited on this electrolytic copper foil by an RF sputtering technique. Sputtering was achieved at a sputter gas (Ar) flow rate of 100 sccm, an ambient substrate temperature (not heated), a reaction pressure of 0.133 Pa ($1.0 \times 10^{-3}$ Torr) and 200 W RF power. The silicon thin film was deposited to a thickness of about 5.5 μm. The resulting silicon thin film was analyzed by Raman spectroscopy which revealed the presence of a peak around 480 $cm^{-1}$ and the absence of a peak around 520 $cm^{-1}$. This analysis revealed an amorphous nature of the silicon thin film.

The current collector carrying the amorphous silicon thin film deposited thereon was cut into a 2.5 cm×2.5 cm size and then vacuum dried at 100° C. for 2 hours to provide a negative electrode.

(Fabrication of Positive Electrode)

85% by weight of $LiCoO_2$ powder with a mean particle diameter of 10 μm, 10% by weight of carbon powder as a conducting agent and 5% by weight of polyvinylidene fluoride powder as a binder were mixed. After addition of N-methylpyrrolidone thereto, the mixture was kneaded to prepare a slurry. This slurry was coated on one surface of a current collector in the form of a 20 μm thick aluminum foil by a doctor blade technique. After vacuum drying at 100° C. for 2 hours, the stack was cut into a 2.0 cm×2.0 cm size to provide a positive electrode.

(Preparation of electrolyte solution A)

1 mole/liter of $LiPF_6$ was dissolved in a mixed solvent containing propylene carbonate and diethyl carbonate at a 3:7 ratio by volume to prepare an electrolyte solution A.

(Preparation of Electrolyte Solution B)

1 mole/liter of $LiPF_6$ was dissolved in a mixed solvent containing ethylene carbonate and diethyl carbonate at a 3:7 ratio by volume to prepare an electrolyte solution B.

(Preparation of Electrolyte Solution C)

1 mole/liter of $LiPF_6$ was dissolved in a mixed solvent containing ethylene carbonate and diethyl carbonate at a 3:7 ratio by volume to provide an electrolyte solution. 0.5 parts by weight (0.4 parts by volume) of vinylene carbonate was added to 100 parts by weight (100 parts by volume) of the electrolyte solution to prepare an electrolyte solution C.

(Preparation of Electrolyte Solution D)

1 mole/liter of $LiPF_6$ was dissolved in a mixed solvent containing ethylene carbonate and diethyl carbonate at a 3:7 ratio by volume to provide an electrolyte solution. 2 parts by weight (1.7 parts by volume) of vinylene carbonate was added to 100 parts by weight (100 parts by volume) of the electrolyte solution to prepare an electrolyte solution D.

(Preparation of Electrolyte Solution E)

1 mole/liter of $LiPF_6$ was dissolved in a mixed solvent containing ethylene carbonate and diethyl carbonate at a 3:7 ratio by volume to provide an electrolyte solution. 3 parts by weight (2.6 parts by volume) of vinylene carbonate was added to 100 parts by weight (100 parts by volume) of the electrolyte solution to prepare an electrolyte solution E.

(Preparation of Electrolyte Solution F)

1 mole/liter of $LiPF_6$ was dissolved in a mixed solvent containing ethylene carbonate and diethyl carbonate at a 3:7 ratio by volume to provide an electrolyte solution. 5 parts by weight (4.4 parts by volume) of vinylene carbonate was added to 100 parts by weight (100 parts by volume) of the electrolyte solution to prepare an electrolyte solution F.

(Preparation of Electrolyte Solution G)

0.9 mole/liter of $LiN(C_2F_5SO_2)_2$ and 0.1 mole/liter of $LiPF_6$ were dissolved in a mixed solvent containing ethylene carbonate and diethyl carbonate at a 3:7 ratio by volume to prepare an electrolyte solution G.

(Preparation of Electrolyte Solution H)

1 mole/liter of $LiPF_6$ was dissolved in a mixed solvent containing ethylene carbonate, vinylene carbonate and diethyl carbonate at a 2.5:0.5:7 ratio by volume to prepare an electrolyte solution H.

(Preparation of Electrolyte Solution I)

1 mole/liter of $LiPF_6$ was dissolved in a mixed solvent containing ethylene carbonate, vinylene carbonate and diethyl carbonate at a 2:1:7 ratio by volume to prepare an electrolyte solution I.

(Preparation of Electrolyte Solution J)

1 mole/liter of $LiPF_6$ was dissolved in a mixed solvent containing ethylene carbonate, vinylene carbonate and diethyl carbonate at a 1:2:7 ratio by volume to prepare an electrolyte solution J.

(Preparation of Electrolyte Solution K)

1 mole/liter of $LiPF_6$ was dissolved in a mixed solvent containing vinylene carbonate and diethyl carbonate at a 3:7 ratio by volume to prepare an electrolyte solution K.

(Preparation of Electrolyte Solution L)

1 mole/liter of $LiPF_6$ was dissolved in a mixed solvent containing ethylene carbonate and ethyl methyl carbonate at a 3:7 ratio by volume to prepare an electrolyte solution L.

(Construction of Batteries)

The above-fabricated positive and negative electrodes were laminated, with a microporous polyethylene film between them, in a glove box under argon gas atmosphere and then inserted into a casing made of laminated aluminum. The above-prepared electrolyte solutions A-L, each in the amount of 50 μl, were introduced into respective casings to construct rechargeable lithium batteries. The design capacity of each battery was 14 mAh.

Figure 3:
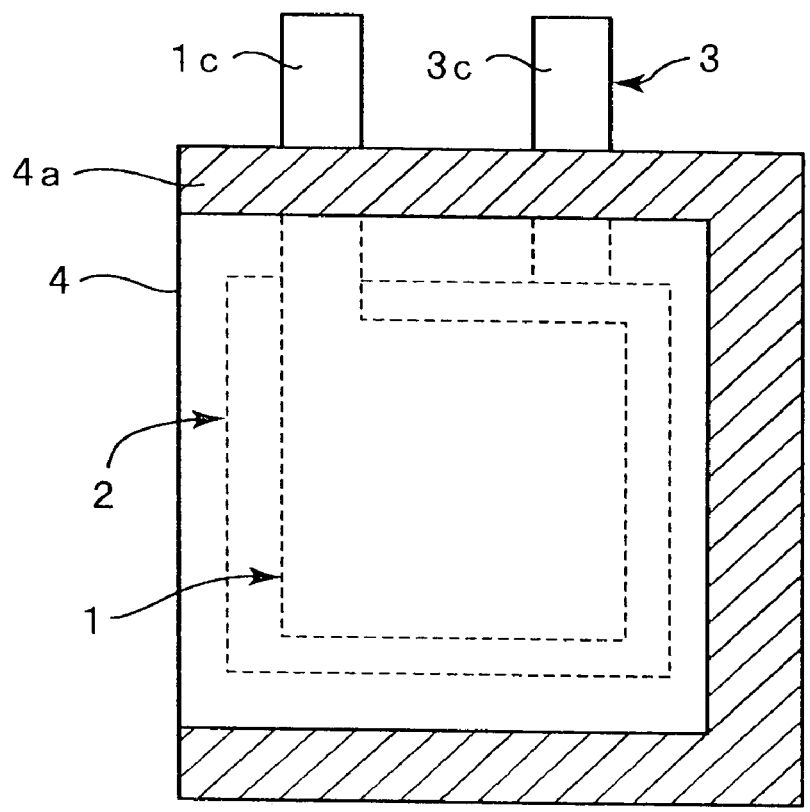
FIG. 3 is a plan view, showing a rechargeable lithium battery constructed in an example of this invention.

FIG. 3 is a plan view which shows the constructed rechargeable lithium battery. As shown in FIG. 3, a positive electrode 1 and a negative electrode 3 are combined through a separator 2 in the form of a microporous polyethylene film and inserted into a casing 4. This is followed by introduction of the electrolyte solution. The casing is then sealed at regions 4a to thereby construct the rechargeable lithium battery.

Figure 4:
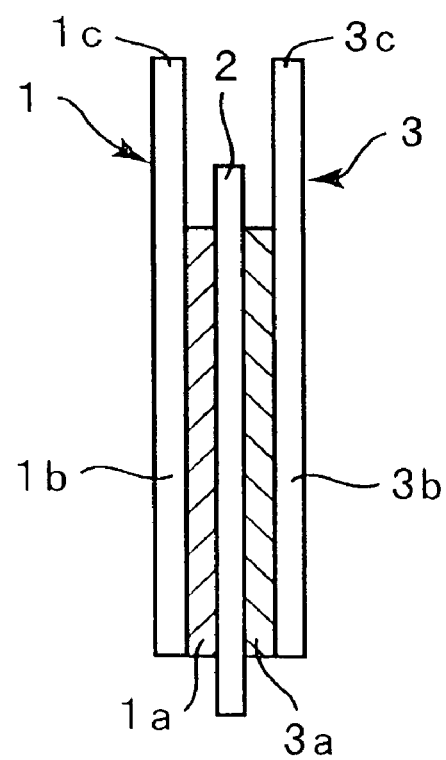
FIG. 4 is a sectional view, showing the arrangement of electrodes as assembled into the rechargeable lithium battery shown in FIG. 3.

FIG. 4 is a sectional view which shows arrangement of battery parts within the battery. As shown in FIG. 4, the positive electrode 1 and the negative electrode 3 were combined in a manner to locate on opposite sides of the separator 2. In the positive electrode 1, a layer 1a of positive active material is provided on a positive current collector 1b made of aluminum. This layer 1a of positive active material is held in contact with the separator 2. In the negative electrode 3, a layer 3a of negative active material is provided on a negative current collector 3b made of copper. This layer 3a of negative active material is held in contact with the separator 2.

As shown in FIG. 4, a positive tab 1c, made of aluminum, is attached to the positive current collector 1b for extension to outside. Also, a negative tab 3c, made of nickel, is attached to the negative current collector 3b for extension to outside.

(Measurement of Charge-discharge Cycle Characteristics)

Each of the batteries using the respective electrolyte solutions A-L was evaluated for charge-discharge cycle performance characteristics. Each battery was charged at a constant current of 14 mA to 4.20 V, further charged at a constant voltage of 4.20 V to 0.7 mA, and discharged at a constant current of 14 mA to 2.75 V. This was taken as a unit cycle. After 100 cycles, a capacity retention rate was calculated from the following equation. The results are given in Table 1. Measurement was carried out at 25° C.

Capacity retention rate=(100th-cycle discharge capacity/1st-cycle discharge capacity)×100

In Table 1, the following abbreviations were used.
PC: propylene carbonate
EC: ethylene carbonate
DEC: diethyl carbonate
VC: vinylene carbonate
EMC: ethyl methyl carbonate
M: mole/liter

TABLE 1

| Type of Electrolyte Solution | 1st-cycle Discharge Capacity (mAh) | 100th-cycle Discharge Capacity (mAh) | Capacity Retention Rate (%) |
| --- | --- | --- | --- |
| A  1.0 M $LiPF_6$ PC/DEC(3/7) | 12.7 | 1.5 | 11.7 |
| B  1.0 M $LiPF_6$ EC/DEC(3/7) | 13.0 | 3.2 | 24.9 |
| C  1.0 M $LiPF_6$ EC/DEC(3/7) + 0.5 p.b.w. VC | 12.7 | 9.7 | 76.6 |
| D  1.0 M $LiPF_6$ EC/DEC(3/7) + 2 p.b.w. VC | 13.7 | 10.5 | 76.7 |
| E  1.0 M $LiPF_6$ EC/DEC(3/7) + 3 p.b.w. VC | 13.3 | 10.5 | 78.9 |
| F  1.0 M $LiPF_6$ EC/DEC(3/7) + 5 p.b.w. VC | 13.4 | 10.8 | 80.9 |
| G  0.9 M $LiN(C_2F_5SO_2)_2$ + 0.1 M $LiPF_6$ EC/DEC(3/7) | 11.3 | 5.6 | 49.6 |
| H  1.0 M $LiPF_6$ EC/VC/DEC(2.5/0.5/7) | 13.5 | 10.6 | 78.3 |
| I  1.0 M $LiPF_6$ EC/VC/DEC(2/1/7) | 13.0 | 10.7 | 82.6 |
| J  1.0 M $LiPF_6$ EC/VC/DEC(1/2/7) | 13.2 | 11.3 | 85.8 |
| K  1.0 M $LiPF_6$ VC/DEC(3/7) | 12.8 | 10.8 | 84.1 |
| L  1.0 M $LiPF_6$ EC/EMC(3/7) | 13.7 | 2.7 | 19.3 |

*p.b.w. = parts by weight

The results shown in Table 1 clearly demonstrate that the improved charge-discharge cycle performance is obtained by using propylene carbonate as a component of a mixed solvent relative to using propylene carbonate as a component of a mixed solvent. They also demonstrate that addition of ethylene carbonate results in marked improvements of charge-discharge cycle performance characteristics. In addition, the use of a mixed solute containing $LiN(C_2F_5SO_2)_2$ and $LiPF_6$ is understood to further improve charge-discharge cycle characteristics.

As can be clearly seen from the comparison between the electrolyte solutions B and L, diethyl carbonate, rather than ethyl methyl carbonate, is preferred for use as chain carbonate.

Figure 2:
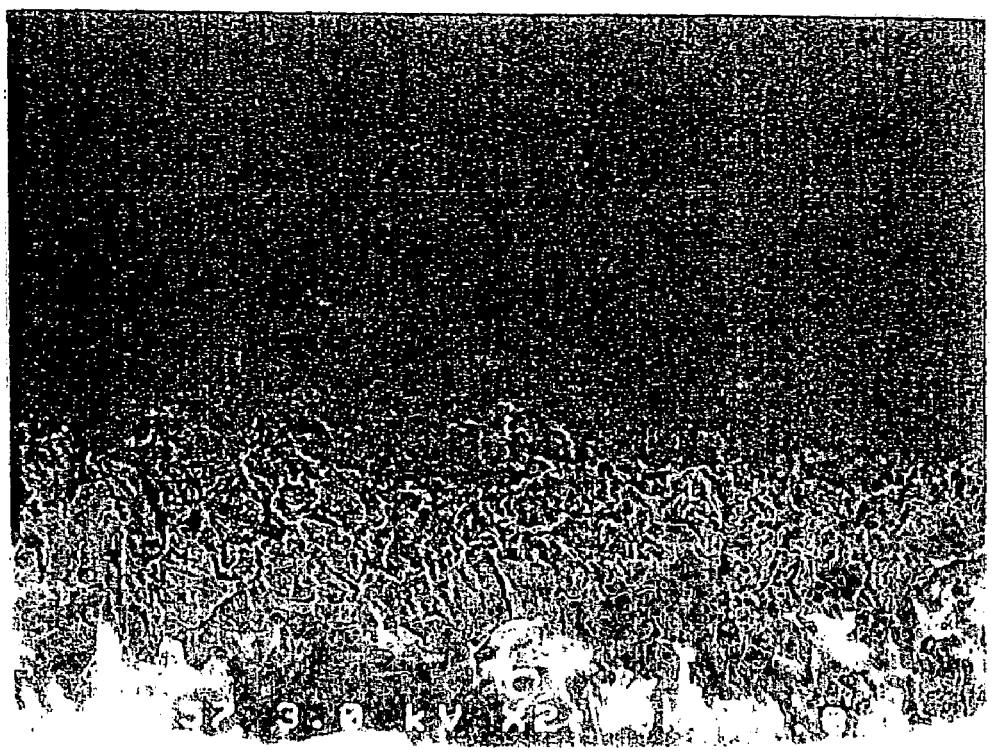
FIG. 2 is a photomicrograph taken using a scanning electron microscope (at a magnification of 2,000×), showing the condition of a negative electrode recovered from a battery in an example of this invention after 100 cycles.

FIG. 1 is a photomicrograph (reflected electron image) taken using a scanning electron microscope, showing the condition of the negative electrode removed from the battery using the electrolyte solution D after 100 cycles. FIG. 2 is a photomicrograph (reflected electron image) taken using a scanning electron microscope, showing the condition of the negative electrode removed from the battery using the electrolyte solution B after 100 cycles. FIGS. 1 and 2 were both taken at a magnification of 2,000×.

As can be clearly seen from FIG. 1, the columnar structure of the silicon thin film is maintained in the negative electrode of the battery using the electrolyte solution D. In the negative electrode of the battery using the electrolyte solution B, the columnar structure of the silicon thin film was partly destroyed and the thin film of active material was partly separated after repetitive charge-discharge cycling, as can be clearly seen from FIG. 2.

UTILITY IN INDUSTRY

In accordance with the present invention, the charge-discharge performance characteristics of rechargeable lithium batteries can be further improved.

The invention claimed is:

1. A rechargeable lithium battery including a positive electrode, a negative electrode and a nonaqueous electrolyte, said negative electrode being an electrode which has, on a current collector, a thin film of active material that stores and releases lithium by forming a solid solution with lithium, said thin film of active material being divided into columns by gaps formed therein in a manner to extend in its thickness direction, and said columnar portions being at their bottoms adhered to the current collector, said rechargeable lithium battery being characterized in that said nonaqueous electrolyte includes a mixed solvent consisting of two or more different solvents and containing at least ethylene carbonate as its constituent and that said thin film of active material is an amorphous or microcrystalline thin film.

2. The rechargeable lithium battery as recited in claim 1, characterized in that a solute in said nonaqueous electrolyte comprises a mixed solute containing $LiXF_y$, where X is P, As, Sb, B, Bi, Al, Ga or In; and y is 6 if X is P, As or Sb and 4 if X is B, Bi, Al, Ga or In, and lithium perfluoroalkylsulfonimide $LiN(C_mF_{2m+1}SO_2)(C_nF_{2n+1}SO_2)$, where m and n are independent integers of 1-4, or lithium perfluoroalkylsulfonmethide $LiC(C_pF_{2p+1}SO_2)(C_qF_{2q+1}SO_2)(C_rF_{2r+1}SO_2)$, where p, q arid r are independent integers of 1-4.

3. The rechargeable lithium battery as recited in claim 1, characterized in that said thin film of active material is deposited by a CVD, sputtering, vapor evaporation, spraying or plating process.

4. The rechargeable lithium battery as recited in claim 1, characterized in that said thin film of active material comprises an amorphous or microcrystalline silicon thin film.

5. The rechargeable lithium battery as recited in claim 1, characterized in that said current collector comprises at least one selected from copper, nickel, stainless steel, molybdenum, tungsten and tantalum.

6. The rechargeable lithium battery as recited in claim 1, characterized in that said current collector has a surface roughness Ra of 0.01-1 μm.

7. The rechargeable lithium battery as recited in claim 1, characterized in that said current collector comprises a copper foil.

8. The rechargeable lithium battery as recited in claim 7, characterized in that said copper foil is an electrolytic copper foil.

9. A rechargeable lithium battery including a positive electrode, a negative electrode and a nonaqueous electrolyte, said negative electrode being an electrode which has, on a current collector, a thin film of active material that stores and releases lithium by forming solid solution with lithium, said thin film of active material being divided into columns by gaps formed therein in a manner to extend in its thickness direction, and said columnar portions being at their bottoms adhered to the current collector, said rechargeable lithium battery being characterized in that said nonaqueous electrolyte includes a mixed solvent consisting of two or more different solvents and containing at least ethylene carbonate as its constituent and that said gaps in the thin film of active material are formed along low-density regions which extend in a thickness direction of the active material thin film.

10. The rechargeable lithium battery as recited in claim 9, characterized in that said mixed solvent contains cyclic carbonate and chain carbonate, and said cyclic carbonate includes ethylene carbonate.

11. The rechargeable lithium battery as recited in claim 10, characterized in that said cyclic carbonate further includes vinylene carbonate.

12. The rechargeable lithium battery as recited in claim 10, characterized in that said chain carbonate includes diethyl carbonate.

13. The rechargeable lithium battery as recited in claim 9, characterized in that said thin film of active material is an amorphous or microcrystalline thin film.

14. A rechargeable lithium battery including a positive electrode, a negative electrode and a nonaqueous electrolyte, said negative electrode being an electrode which has, on a current collector, a thin film of active material that stores and releases lithium by forming a solid solution with lithium, said thin film of active material being divided into columns by gaps formed therein in a manner to extend in its thickness direction, and said columnar portions being at their bottoms adhered to the current collector, said rechargeable lithium battery being characterized in that said nonaqueous electrolyte includes a mixed solvent consisting of two or more different solvents and containing at least ethylene carbonate as its constituent and that a constituent of said current collector is diffused into the thin film of active material.

15. The rechargeable lithium battery as recited in claim 14, characterized in that said current collector constituent diffused into said thin film of active material forms therein a solid solution, instead of an intermetallic compound, with a component of the active material thin film.

16. A rechargeable lithium battery including a positive electrode, a negative electrode and a nonagueous electrolyte, said negative electrode being an electrode which has, on a current collector, a thin film of active material that stores and releases lithium by forming a solid solution with lithium, said thin film of active material being divided into columns by gaps formed therein in a manner to extend in its thickness direction, and said columnar portions being at their bottoms adhered to the current collector, said rechargeable lithium battery being characterized in that said nonaqueous electrolyte includes a mixed solvent consisting of two or more different solvents and containing at least vinylene carbonate as its constituent.

17. The rechargeable lithium battery as recited in claim 16, characterized in that said mixed solvent contains cyclic carbonate and chain carbonate, and said cyclic carbonate includes vinylene carbonate.

18. The rechargeable lithium battery as recited in claim 17, characterized in that said chain carbonate includes diethyl carbonate.

* * * * *